Figure 1:
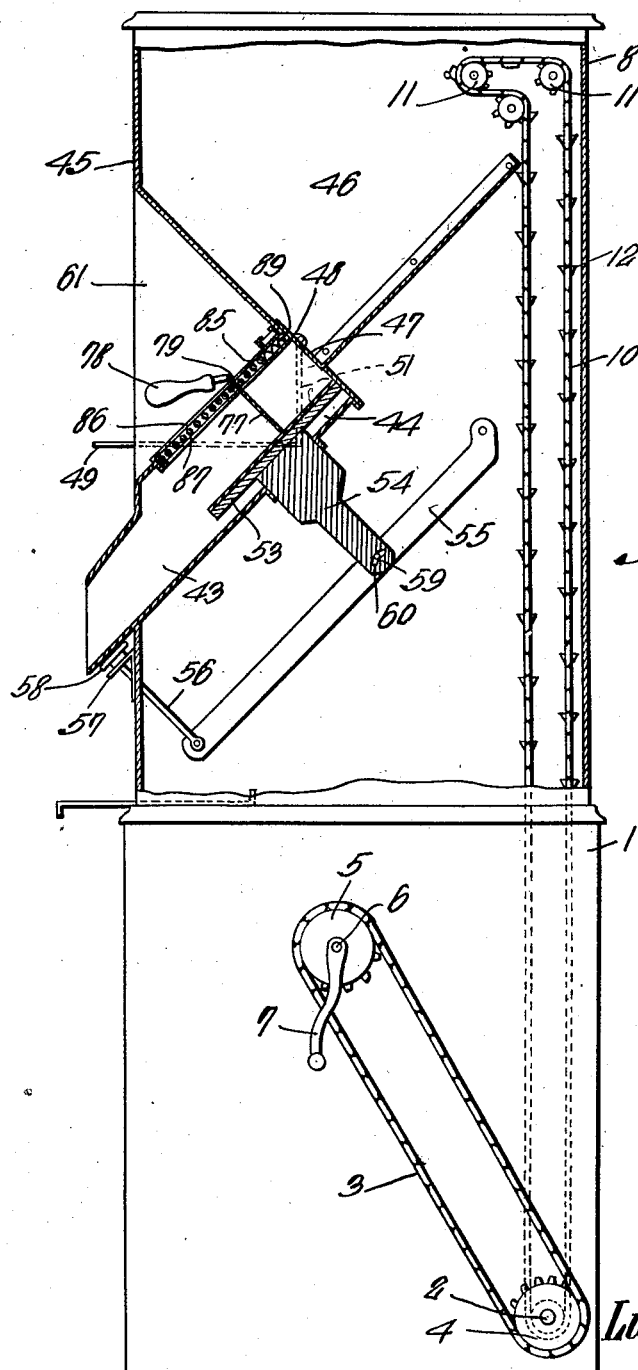

L. B. THOMAS.
COMBINED MEASURING AND DISPENSING BIN.
APPLICATION FILED AUG. 1, 1912.

1,097,149.

Patented May 19, 1914.
2 SHEETS—SHEET 1.

Witnesses

Luther B. Thomas
Inventor by C. A. Snow & Co.
Attorneys

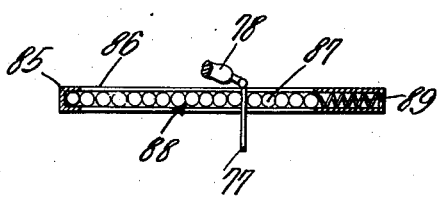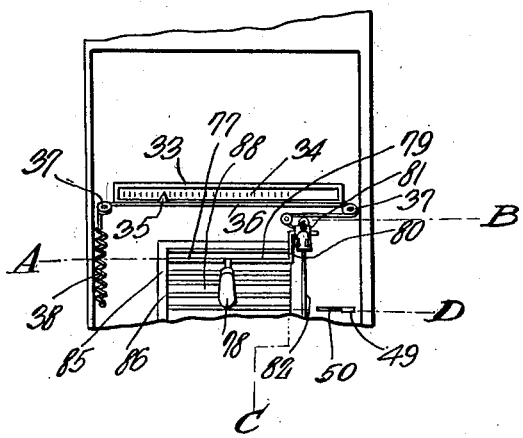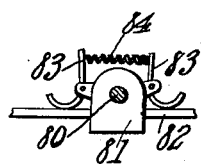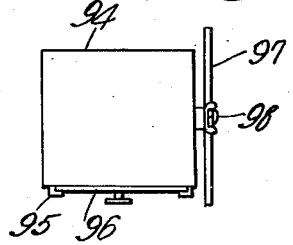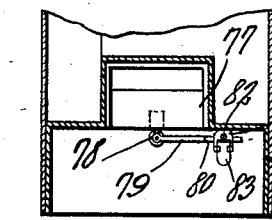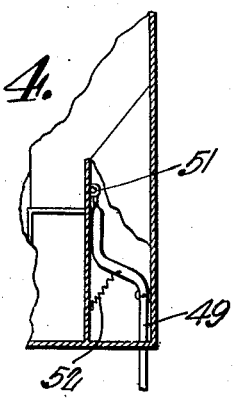

UNITED STATES PATENT OFFICE.

LUTHER B. THOMAS, OF SHREVEPORT, LOUISIANA, ASSIGNOR OF ONE-TENTH TO J. M. ROBINSON, OF BAYOU LA CHUTE, LOUISIANA.

COMBINED MEASURING AND DISPENSING BIN.

1,097,149.  Specification of Letters Patent.  Patented May 19, 1914.

Original application filed October 16, 1911, Serial No. 654,900. Divided and this application filed August 1, 1912. Serial No. 712,757.

*To all whom it may concern:*

Be it known that I, LUTHER B. THOMAS, a citizen of the United States, residing at Shreveport, in the parish of Caddo and State of Louisiana, have invented a new and useful Combined Measuring and Dispensing Bin, of which the following is a specification.

This invention relates to computing bins and is more particularly a division of an application filed in the United States Patent Office by me on October 16, 1911, said application bearing Serial No. 654,900.

One of the objects of the invention is to provide improved means whereby material to be dispensed can be measured.

Another object is to provide improved means for cutting off the material in measured quantities, means being provided for preventing leakage of the measured material and for protecting it from dust, etc.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings:—Figure 1 is a view partly in section and partly in side elevation of a bin having the present improvements combined therewith. Fig. 2 is a front elevation of a portion of the bin. Fig. 3 is an enlarged longitudinal section through the top of the measuring compartment and showing the cut-off in elevation. Fig. 4 is a horizontal section through a portion of the apparatus and showing the slide shifting lever in plan, said section being taken on the line C—D Fig. 2. Fig. 5 is a section on line A—B Fig. 2. Fig. 6 is a plan view of a modified form of cut-off and connections. Fig. 7 is a front elevation thereof. Fig. 8 is an enlarged side elevation of the slide and showing the clips thereon.

Referring to the figures by characters of reference 1 designates a storage bin having a transverse shaft 2 in the bottom portion thereof which may be driven by means of a chain 3 engaging a sprocket 4 secured to the shaft 2 and another sprocket 5 secured to an actuating shaft 6. Said actuating shaft may be driven by means of a crank 7 or the like. Obviously any other suitable means may be used for driving the shaft 2.

The pin 1 constitutes a pedestal on which is mounted an upper dispensing bin 45 having a dispensing compartment 46 in the upper portion thereof and which is adapted to be supplied from the storage bin 1 by means of an endless elevator 10. This elevator is actuated by shaft 2 and is mounted on guide sprockets 11 or the like mounted in the upper portion of the bin 45 said elevator having a portion thereof overhanging the compartment 46 so that, as the buckets 12 of the elevator are brought successively into position above said compartment 46, they will dump their contents into the compartment.

The compartment 46 is provided with an outlet 47 opening into a measuring compartment 44 which is inclined relative to the bin and has an outlet spout 43, the spout and measuring compartment being preferably inclined at an angle of about 45 degrees or more to the bottom of the bin. The outlet 47 of the dispensing bin 45 is normally closed by means of a laterally movable slide 48 preferably operated by means of a horizontal lever 49 one end of which extends through a transverse slot 50 in the front of the bin 45 while the other end has an arm 51 extending perpendicularly therefrom and pivotally connected to one side of the slide 48. Thus it will be seen that when the lever is pushed to one side the slide will be opened and when the front end of the lever is pushed in the opposite direction the slide will be closed. A spring 52 may be located at any suitable point and is attached to the lever 49 so as to hold the slide normally closed. The measuring compartment 44 is provided with a back plate 53 having a stem 54 adjustably mounted in the back or lower wall of the compartment 44. The means provided for adjusting the stem preferably consists of a lever 55 fulcrumed at one end within the bin 45 and having an adjusting screw 56 pivotally connected to its other end and extending through a bracket 57 on the front face of the bin 45. Said screw is engaged by an adjusting nut 58 whereby the lever 55 can be swung upwardly or downwardly so as to move the stem 54 and the plate 53 in the desired direction. It is to be understood of course that there is a movable connection between the lever 55 and the stem 54, said connection being preferably in the form of a pin 59 mounted within a slot 60.

When the measuring compartment 44 is inclined, it is preferably extended under the dispensing compartment 46 so that a recess 61 is thus formed between the bottom of the compartment 46 and the top of the measuring compartment 44. The bottom of this recess is formed by the top 85 of the measuring compartment. This top 85 has an opening 86 the side walls of which are grooved longitudinally as indicated at 87 so as to receive the ends of rollers 88. Said rollers are held normally in contact by means of springs 89 bearing against one of the end rollers. A cut-off plate 77 is adapted to be inserted between any two adjoining rollers 87 and has a handle 78 extending from its outer edge. This cut-off plate is connected to one end of an arm 79 extending laterally from a strip 80 which, in turn, is pivotally connected to a sleeve 81 slidably mounted on a guide rod 82. Said sleeve has a spring clip of any desired form for locking the sleeve in any position to which it may be adjusted. As shown in Fig. 8, this clip can consist of opposed gripping levers 83 and a spring 84 interposed between the levers and serving to press them yieldingly against the rod 82. It will be apparent that by releasing the clip from the guide rod 82, the sleeve 81 can be moved along said rod to any desired point and the cut-off plate 77 can be swung downwardly into position between any two adjoining rollers 88. In this structure an indicator casing 33 extends across the front of the plate 85 and has an open front face through which appears a graduated strip 34 having data thereon indicating pounds and the prices thereof. This strip 34 is removably mounted in the casing 33 and is prepared for use with one kind of material to be dispensed. Should another kind of material of a different weight and price be substituted a different strip 34 would be inserted into the casing 33. An index or pointer 35 is mounted to slide longitudinally of the casing 33 and is connected to a cord 36 or the like. This cord extends longitudinally through the casing 33 and is mounted on guide sheaves 37. One end of the cord is attached to the sleeve 81 while the other end is connected to a spring 38 which, in turn, is secured to the bin. The pointer 35 is of course connected to an intermediate portion of the cord. It will be apparent that when the sleeve 81 is pulled downwardly, the cord 36 will be moved therewith and cause the pointer or index 35 to move longitudinally of the casing 33, thus elongating the spring 38. When, however, the sleeve 81 is raised, the spring 38 will hold the cord taut and move the index in the opposite direction.

It is thought that the operation of the apparatus will be understood from the foregoing description when read in connection with the accompanying drawings. By shifting the cut-off 77 until a desired graduation is indicated by the index 35, and then moving the cut-off downwardly between the rollers thereunder so as to close the measuring compartment 44, the cut-off 48 can be shifted whereupon material within the bin 46 will flow into the measuring compartment until said compartment is completely filled above the cut-off 77. Plate 48 is then shifted back to closed position after which the cut-off 77 is tilted or swung out of position so as to permit the contents of the measuring compartment to gravitate from the compartment through the spout 43. By means of the lever 55 and its coöperating parts, the transverse area of the measuring compartment can be varied at will. Instead of mounting the cut-off upon a pivoted structure, as heretofore described, a slide 94 may be mounted on the top plate of the measuring compartment and may be provided with guides 95 in which the cut-off 96 is adapted to slide. The slide 94 may be connected to a guide rod 97 by means of a clip 98 fastened to the slide. This structure has been illustrated in Figs. 6 and 7.

What is claimed is:—

1. Apparatus of the class described including a measuring compartment having an opening in one wall thereof, bodily movable elements disposed normally in the same plane for normally closing the opening, means for yieldingly pressing said elements, and a cut-off adapted to be inserted between any two adjacent elements and to move those at one side of the cut-off against said yielding means the cut-off being movable through the opening into the measuring compartment.

2. In apparatus of the class described, a measuring compartment having an opening in one wall, bodily movable elements disposed in the same plane and normally closing the opening, means for yieldingly pressing said elements, and a cut-off within the opening and compartment and shiftable relative to the opening.

3. Apparatus of the class described including a measuring compartment having an opening in one wall, means comprising separate elements for closing the opening and disposed in the same plane, yielding means for holding said elements normally in contact, and a cut-off movable between any two of said elements and into the measuring compartment, said elements being individually movable bodily relative to each other.

4. Apparatus of the class described including a measuring compartment having an opening in one wall, parallel rollers constituting a closure for said opening, yielding means for holding the rollers normally in contact, and a cut-off movable between any two of the rollers and into the compartment.

5. Apparatus of the class described including a dispensing compartment, a measuring compartment communicating therewith, means for closing communication between the compartments, a back plate adjustably mounted within the measuring compartment, a cut-off plate adjustable longitudinally of the measuring compartment, means for shifting the cut-off plate into and out of the measuring compartment, an adjusting lever, means for actuating the same, and a connection between said lever and the back plate.

6. The combination with a dispensing bin having an adjustable measuring compartment having an opening in one wall thereof, of yielding means normally closing the opening, a guide extending longitudinally of the opening, a member slidable on the guide, a cut-off movable with said member, said cut-off being insertible between the yielding means and into the measuring compartment.

7. The combination with a dispensing bin having an adjustable measuring compartment having an opening in one wall thereof, of yielding means normally closing the opening, a guide extending longitudinally of the opening, a member slidable on the guide, a cut-off movable with said member, said cut-off being insertible between the yielding means and into the measuring compartment, and means controlled by said movable member for indicating the amount of material supported by the cut-off within the measuring compartment.

In testimony that I claim the foregoing as my own, I have hereto affixed my signature in the presence of two witnesses.

LUTHER B. THOMAS.

Witnesses:
W. C. LANING,
G. W. HAYS.

Copies of this patent may be obtained for five cents each, by addressing the "Commissioner of Patents, Washington, D. C."